(12) United States Patent
Hiromatsu et al.

(10) Patent No.: US 7,767,929 B2
(45) Date of Patent: Aug. 3, 2010

(54) METHOD FOR REMOVING FOREIGN MATTER ON GLASS SUBSTRATE SURFACE

(75) Inventors: Kuniaki Hiromatsu, Yokohama (JP); Yuzo Watanabe, Yokohama (JP); Motoichi Iga, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 592 days.

(21) Appl. No.: 11/196,401

(22) Filed: Aug. 4, 2005

(65) Prior Publication Data

US 2006/0032842 A1 Feb. 16, 2006

Related U.S. Application Data

(63) Continuation of application No. PCT/JP2004/001041, filed on Feb. 3, 2004.

(30) Foreign Application Priority Data

Feb. 4, 2003 (JP) ............................ 2003-027237

(51) Int. Cl.
*B23K 26/00* (2006.01)
(52) U.S. Cl. ............................ 219/121.69; 219/121.68; 219/121.85
(58) Field of Classification Search ............ 219/121.69, 219/121.68, 121.85
See application file for complete search history.

(56) References Cited

U.S. PATENT DOCUMENTS 4,897,371 A * 1/1990 Suzuki et al. .................. 501/70
5,759,416 A * 6/1998 Bosman et al. ................ 216/13
6,500,778 B1 * 12/2002 Maeda et al. .................. 501/66
6,566,628 B2 * 5/2003 Vogt et al. ............. 219/121.69
6,596,966 B1 * 7/2003 Kickelhain et al. ...... 219/121.69
6,846,760 B2 * 1/2005 Siebers et al. ................. 501/32
2002/0010066 A1 * 1/2002 Nakashima et al. ........... 501/69

FOREIGN PATENT DOCUMENTS

| JP | 03-033038 | * 2/1991 |
|---|---|---|
| JP | 3-33038 | 2/1991 |
| JP | 05-015474 | * 1/1993 |
| JP | 5-15474 | 1/1993 |
| JP | 9-295832 | 11/1997 |
| JP | 9-295833 | 11/1997 |
| JP | 10-85684 | 4/1998 |
| JP | 2001-58843 | 3/2001 |
| JP | 2001-64034 | 3/2001 |
| JP | 2001-348246 | * 12/2001 |

* cited by examiner

*Primary Examiner*—M. Alexandra Elve
(74) *Attorney, Agent, or Firm*—Oblon, Spivak, McClelland, Maier & Neustadt, L.L.P.

(57) ABSTRACT

It is to provide a method for removing a tin defect present on the surface of a glass substrate produced by a float process in a short time without the glass substrate surface being damaged regardless of the glass temperature.

A method for removing a tin-containing foreign matter from the surface of glass, which comprises applying to the surface of a glass substrate produced by a float process a pulse laser beam having a transmittance of at least 70% through the glass substrate and having a pulse width, a wavelength and an energy density per unit area on the glass substrate surface which satisfy specific relations, to remove a tin-containing foreign matter present on the rear face opposite to the face irradiated with the pulse laser beam.

11 Claims, 3 Drawing Sheets

METHOD FOR REMOVING FOREIGN MATTER ON GLASS SUBSTRATE SURFACE

BACKGROUND OF THE INVENTION

1. Field of the Invention

The present invention relates to a method for removing a tin-containing foreign matter present on the surface of a glass substrate produced by a float process and a glass substrate having a tin-containing foreign matter removed by this method. Specifically, it relates to a method for removing a tin-containing foreign matter present on the surface of a glass substrate by applying to the surface of a glass substrate produced by a float process, a pulse laser beam having a transmittance of at least 70% through the glass substrate and having a pulse width, a wavelength and an energy density per unit area on the surface of the glass substrate which satisfy specific relations, and a glass substrate having a tin-containing foreign matter removed by this method.

2. Discussion of Background

At present, a dominant method for producing a glass substrate is a float process. This is a process wherein molten glass is continuously supplied on a bath called a molten metal bath filled with molten metal tin to form a glass ribbon, and the glass ribbon is made to advance while being made to float up along the surface of the molten metal bath to form a plate, and is very excellent in mass production of glass substrates having high smoothness.

However, in this float process, a foreign matter containing tin called bottom speck, more specifically, a foreign matter containing metal tin or a tin oxide as the main component (hereinafter sometimes referred to as "tin defect") forms on the bottom face of the glass ribbon which is in contact with the molten tin. This bottom speck may adhere to the glass substrate as a foreign matter larger than a top speck mentioned below in some cases.

Further, in the float process, a top speck due to molten metal tin is inevitable also on the top face of the glass ribbon. The top speck is such a defect that a tin component evaporated from the molten metal bath condenses on the ceiling portion or the wall portion as the upper portion of the bath, and the resulting condensate or the condensate reduced to a metal state falls as a small particle on a glass base material and adheres to the top face of the glass ribbon as a tin defect with a size of from several μm to several tens μm.

As the application of glass is broadened from a conventional field of building materials to a field of electronic materials, the tin defect such as a top speck or a bottom speck on the surface of a glass substrate produced by a float process becomes problematic.

For example, in a case of a glass substrate for a flat plane display to be used for a liquid crystal display, a plasma display panel or the like, if a tin defect with a visible size is observed on a glass substrate produced, the portion containing the tin defect of the glass substrate is discarded as a defective.

In recent years, as a glass substrate for a flat panel display has a high definition, the standard regarding the size of the tin defect present on the surface of a glass substrate becomes stricter. Further, along with increase in size of a flat panel display, the glass substrate for a flat panel display becomes large, and accordingly the area of a glass substrate to be discarded as a defective if a tin defect forms becomes larger, which may cause decrease in productivity.

As a method of removing a foreign matter such as a top speck on the surface of a glass substrate produced by a float process, a method of immersing a glass substrate in a treatment solution comprising a hydrofluoric acid aqueous solution or a acidic aqueous solution containing bivalent chromium ions to dissolve and thereby remove a foreign matter has been proposed. The method using the latter treatment solution is disclosed, for example, in JP-A-9-295832 and JP-A-9-295833.

However, with the above method of immersing a glass substrate in a treatment solution, it is required that the immersion time in the treatment solution is long so as to remove the tin defect to such an extent that the standard required for the glass substrate for a flat panel display is satisfied.

Accordingly, a method of removing a tin defect from the surface of a glass substrate produced by a float process in a short time has not been known.

A method of removing a foreign matter adhering to the glass surface by application of a laser beam is known. For example, in order to remove a foreign matter adhering to the glass surface in a non-contact manner, a method is disclosed wherein an ultraviolet laser beam having a pulse width of at most 100 ns and an energy density of at least 0.1 J/cm$^2$ is made to pass through the glass and is applied to the foreign matter (JP-A-5-15474).

In this method, by application of a laser beam in an ultraviolet region which is likely to be absorbed in a substance at a pulse width of at most 100 ns at an energy density of at least 0.1 J/cm$^2$, the foreign matter present on the glass surface instantaneously generates heat, transpires and flies and is thereby removed.

However, the laser beam in the ultraviolet region used in this method is absorbed in glass itself, and when a laser beam at a relatively wide pulse width of from 50 to 100 ns at a (relatively) high energy density of at least 0.1 J/cm is applied, the surface of the glass substrate is considered to be damaged due to thermal processing.

JP-A-5-15474 discloses that a foreign matter is completely evaporated and flies without the glass surface being damaged. However, the glass surface in this publication means a surface to which a foreign matter adheres of the glass, and it does not disclose presence or absence of damage on a plane of the glass where the laser beam enters. Further, the method of JP-A-5-15474 is to remove dirt or dust adhering to the surface of a window glass in a tall building, etc. However, as described above, in the field of electronic materials such as a glass substrate for a flat panel display, even a fine defect on the glass substrate surface negligible in the conventional field of building materials becomes problematic.

In order to solve the above problems, it is an object of the present invention to provide a method capable of removing a tin-containing foreign matter present on the surface of a glass substrate produced by a float process in a short time without the glass substrate surface being damaged, which is useful at an industrial level, and a glass substrate having a tin-containing foreign matter removed by this method.

The present inventors have conducted extensive studies to achieve the above object and as a result, found that a tin-containing foreign matter present on the surface of a glass substrate can be removed by applying to the surface of a glass substrate a pulse laser beam which has a high transmittance through the glass substrate and is thereby relatively less likely to be absorbed in glass under conditions where the pulse width, the wavelength and the energy density per unit area on the glass substrate surface satisfy specific relations, without the glass substrate surface being damaged. The present invention has been accomplished on the basis of this discovery.

Namely, the present invention provides a method for removing a tin-containing foreign matter from the surface of a glass substrate, produced by a float process, which comprises applying to the surface of a glass substrate produced by a float process, a pulse laser beam which has a transmittance of at least 70% through the glass substrate and which satisfies the following formulae (1) and (2), to remove a tin-containing foreign matter present on the surface irradiated with the pulse laser beam and/or on the rear side opposite to the side irradiated with the pulse laser beam:

$$2.5 \times 10^8 \leq E/t \tag{1}$$

$$E/(\lambda \times t^{1/2}) \leq 1000 \tag{2}$$

wherein E is the energy density (J/cm$^2$) of the pulse laser beam per unit area on the surface of the glass substrate, t is the pulse width (sec) of the pulse laser beam, and $\lambda$ is the wavelength (nm) of the pulse laser beam.

In the method of the present invention, the pulse laser beam more preferably satisfies at least one of the following formulae (3) and (4):

$$5.0 \times 10^8 \leq = E/t \tag{3}$$

$$E/(\lambda \times t^{1/2}) \leq 500 \tag{4}$$

wherein E, t and $\lambda$ are as defined for the above formulae (1) and (2).

In the method of the present invention, the pulse laser beam more preferably satisfies both the above formulae (3) and (4).

In the method of the present invention, the pulse laser beam preferably has a transmittance of at least 75% through the glass substrate.

In the method of the present invention, the pulse laser beam preferably has a wavelength of from 350 to 1,200 nm.

The pulse laser beam more preferably has a wavelength of from 400 to 1,200 nm.

Further, in the method of the present invention, the pulse laser beam preferably has a pulse width of at most 20 nsec.

Further, the pulse laser beam more preferably has a pulse width of at most 10 nsec, furthermore preferably at most 15 psec.

In the method of the present invention, it is preferred that the pulse laser beam is applied to the glass substrate over the entire width.

In the method of the present invention, the glass substrate is preferably a glass substrate for a flat panel display.

In the method of the present invention, the glass substrate may have a thickness exceeding 3 mm, but preferably has a thickness of at least 0.4 mm and at most 3 mm. The glass substrate more preferably has a thickness of at most 1 mm.

In the method of the present invention, the glass substrate preferably has the following composition:
SiO$_2$: 40 to 85 mass %
Al$_2$O$_3$: 0 to 35 mass %
B$_2$O$_3$: 0 to 25 mass %
MgO+CaO+SrO+BaO+ZnO: 1 to 50 mass %
Li$_2$O+Na$_2$O+K$_2$O+Rb$_2$O+Cs$_2$O: 0 to 1 mass %

Further, the glass substrate preferably has the following composition:
SiO$_2$: 40 to 85 mass %
Al$_2$O$_3$: 2 to 35 mass %
B$_2$O$_3$: 0 to 25 mass %
MgO+CaO+SrO+BaO+ZnO: 1 to 50 mass %
Li$_2$O+Na$_2$O+K$_2$O+Rb$_2$O+Cs$_2$O: 1.1 to 30 mass %

Further, the glass substrate preferably has the following composition:
SiO$_2$: 40 to 80 mass %
Al$_2$O$_3$: 0 to 2 mass %
MgO+CaO+SrO+BaO+ZnO: 1 to 50 mass %
Li$_2$O+Na$_2$O+K$_2$O+Rb$_2$O+Cs$_2$O: 1.1 to 30 mass %

Further, the present invention provides a glass substrate having a tin-containing foreign matter removed from the surface of a glass substrate produced by a float process, by the method for removing a tin-containing foreign matter of the present invention.

DETAILED DESCRIPTION OF THE PREFERRED EMBODIMENTS

Now, the method of the present invention will be explained with reference to drawings. However, the drawings are exemplified so that the method of the present invention is easily understood, and the method of the present invention is not limited thereto.

Figure 1:
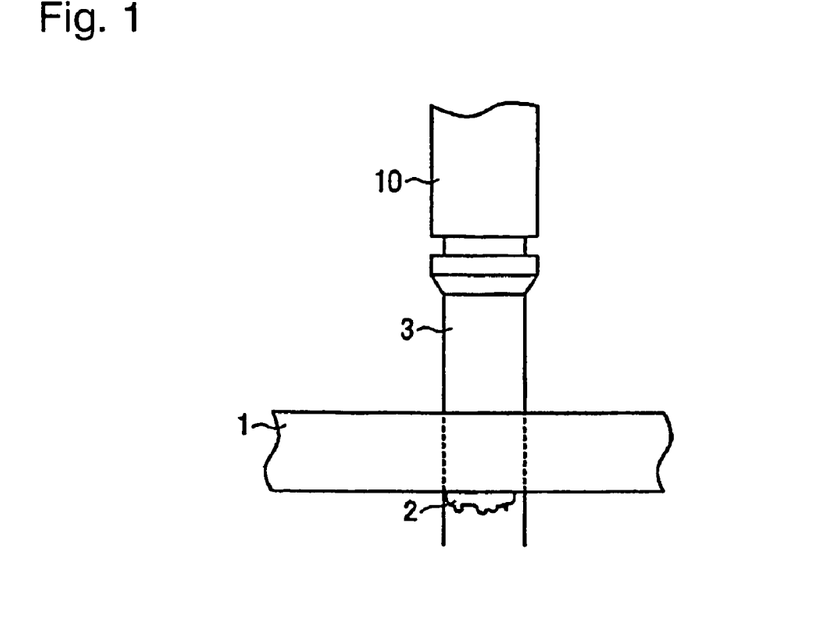
FIG. 1 is a cross-sectional view explaining the method of the present invention and illustrating a portion where a tin defect is present on the surface of a glass substrate.

FIG. 1 is a view explaining the method of the present invention and is a cross-sectional view illustrating a portion where a tin-containing foreign matter 2 i.e. a tin defect is present on the surface of a glass substrate 1. In the field of glass plate production, a tin-containing foreign matter which adheres to the surface of a glass substrate produced by a float process, specifically, a foreign matter containing metal tin or a tin oxide as the main component, is generally called a tin defect. Hereinafter, a tin-containing foreign matter which adheres to the surface of a glass substrate, to be removed by the method of the present invention, will be referred to as a tin defect. The tin defect is one containing from 90 to 100 mass % of tin and containing another component such as Fe, Zn, Pb, Cu or O in many cases, and the degrees of oxidation of tin are different in each case in many cases.

The tin defect adhering to the surface of a glass substrate produced by a float process is classified into a bottom speck which adheres to the bottom face of a glass ribbon (glass substrate) which is in contact with molten tin in glass substrate production process and a top speck with a size of from several μm to several tens μm formed in such a manner that a tin component evaporated from the molten metal bath condenses on the ceiling portion or the wall portion as the upper portion of the bath, and the resulting condensate or the condensate reduced to a metal state falls as a small particle on a glass base material and adheres to the top face of the glass ribbon (glass substrate). The bottom speck adhering to the bottom face of the glass substrate may be larger than the top speck adhering to the top face in some cases. The method of the present invention can remove both of these tin defects.

In the method of the present invention, to the portion where the tin defect 2 is present on the surface of the glass substrate 1, a pulse laser beam 3 having a transmittance of at least 70% through the glass substrate from a laser light source 10 is applied, whereby the tin defect 2 evaporates or flies from the surface of the glass substrate 1 and is removed. It is preferred that the pulse laser beam is applied preferably from the rear face side opposite to the face to which the tin defect 2 adheres of the glass substrate 1 as shown in FIG. 1, and the reason will be described in detail hereinafter. However, in the method of the present invention, a pulse laser beam may be applied directly to the face to which the tin defect 2 adheres of the glass substrate 1, and the effect of the present invention such that the tin defect is removed from the surface of the glass substrate will not be impaired.

The method of the present invention is characterized by use of a pulse laser beam having a transmittance of at least 70% through the glass substrate. By using a pulse laser beam having a transmittance of at least 70% through the glass substrate, the applied pulse laser beam will not be substantially absorbed in the glass substrate, and is absorbed only in the tin defect present on the surface of the glass substrate. Accordingly, the tin defect will be removed in a short time, specifically, the tin defect present on the portion irradiated with a pulse laser beam will be removed substantially simultaneously with irradiation with the pulse laser beam, without the glass substrate surface being damaged.

The pulse laser beam more preferably has a transmittance of at least 75% through the glass substrate. When the pulse laser beam has a transmittance of at least 75% through the glass substrate, more excellent effect will be obtained in that the applied pulse laser beam will not substantially be absorbed in the glass substrate, and more excellent effect of the present invention such that the tin defect can be removed from the surface of the glass substrate will be obtained without the glass substrate surface being damaged. From similar reasons, the pulse laser beam has a transmittance through the glass substrate of more preferably at least 80%, particularly preferably at least 85%.

The transmittance of the pulse laser beam through the glass substrate varies depending upon the wavelength of the pulse laser beam, the composition and thickness of the glass through which the beam passes, etc. The glass substrate to be used in the method of the present invention is preferably a glass substrate for a flat panel display such as an electroluminescence display (ELD) including a plasma display (PDP) and an organic electroluminescence (EL) display, a FED (field emission display), a TN (twisted nematic) liquid crystal panel, a STN (supertwisted nematic) liquid crystal panel or a thin film transistor liquid crystal display (TFT-LCD).

As a specific example of a glass substrate to be used for a flat panel display at present, one having the following composition may be mentioned:
$SiO_2$: 40 to 85 mass %
$Al_2O_3$: 0 to 35 mass %
$B_2O_3$: 0 to 25 mass %
MgO+CaO+SrO+BaO+ZnO: 1 to 50 mass %
$Li_2O+Na_2O+K_2O+Rb_2O+Cs_2O$: 0 to 1 mass %

Further, as another specific example of a glass substrate for a flat panel display, one having the following composition may be mentioned:
$SiO_2$: 40 to 85 mass %
$Al_2O_3$: 2 to 35 mass %
$B_2O_3$: 0 to 25 mass %
MgO+CaO+SrO+BaO+ZnO: 1 to 50 mass %
$Li_2O+Na_2O+K_2O+Rb_2O+Cs_2O$: 1.1 to 30 mass %

Further, as still another specific example of a glass substrate for a flat panel display, one having the following composition may be mentioned.
$SiO_2$: 40 to 80 mass %
$Al_2O_3$: 0 to 2 mass %
MgO+CaO+SrO+BaO+ZnO: 1 to 50 mass %
$Li_2O+Na_2O+K_2O+Rb_2O+Cs_2O$: 1.1 to 30 mass %

The thickness of the glass substrate for a flat panel display is usually at least 0.4 mm and at most 3 mm, and a substrate having a thickness of at most 1 mm, and further a substrate having a thickness of at most 0.7 mm, are increasing. However, the glass substrate to which the method of the present invention is applicable is not limited thereto, and the present invention may be applicable to a substrate having a thickness exceeding 3 mm.

In order that the pulse laser beam has a transmittance of at least 70% through the glass substrate for a flat panel display as exemplified above, usually the pulse laser beam should have a wavelength within a range of from 300 to 2,750 nm. The pulse laser beam more preferably has a wavelength of from 350 to 1,200 nm in view of the transmittance, it may be in an ultraviolet region of from 350 to 400 nm, may be in a visible region of from 400 to 700 nm, or may be in a near infrared region of from 700 to 1,200 nm. However, a pulse laser beam in an ultraviolet region tends to be relatively likely to be absorbed in a glass substrate as compared with a pulse laser beam in a visible region or in a near infrared region. Accordingly, it is required to increase the energy density of the pulse laser beam so as to remove the tin defect. However, due to such a characteristic that the pulse laser beam is relatively likely to be absorbed in a glass substrate, the glass substrate surface may be damaged when the energy density of the pulse laser beam is increased. Accordingly, the pulse laser beam more preferably has a wavelength of from 400 to 1,200 nm in visible and near infrared regions, among the above wavelengths. When the wavelength of the pulse laser beam is within the above range, in a case where the pulse laser beam further satisfies the following formulae (1) and (2), particularly excellent effect of the method of the present invention such that the tin defect is removed from the surface of a glass substrate will be obtained without the glass substrate surface being damaged. Further, when the wavelength of the pulse laser beam is within the above range, a commercial pulse laser beam irradiation apparatus can be utilized.

The pulse laser beam used in the method of the present invention is required to have, in addition to a transmittance of at least 70% through the glass substrate, a pulse width, a wavelength and an energy density per unit area on the glass substrate surface which satisfy specific relations as mentioned hereinafter.

It has been attempted to remove a foreign matter by applying to the glass surface a pulse laser beam having a wavelength which overlaps with that of the pulse laser beam used in the method of the present invention in JP-A-5-15474. JP-A-5-15474 discloses that when an infrared laser having a pulse width of 1 msec and a wavelength of 1.06 μm (1,060 nm) is applied from a glass rear face side and is made to pass through the glass so that a foreign matter (oil Magic Ink) on the front face side is irradiated with the laser as a preliminary experiment, an extravagant energy such as an energy density of 90 J/cm$^2$ per unit area is required and in addition, when the energy density exceeds 40 J/cm$^2$, the glass surface is damaged. Namely, it discloses that to remove a foreign matter from the glass surface, it is required to apply a laser beam having an energy density higher than the energy density with which the glass surface will be damaged.

Even though the method as disclosed in JP-A-5-15474 provided the above results, a tin defect present on the glass substrate surface can be removed by the method of the present invention without the glass substrate surface being damaged by application of a pulse laser beam having a wavelength which overlaps with that of JP-A-5-15474. This is considered to be mainly because of the following two reasons.

(a) The foreign matter to be removed in the method of the present invention is different from that of the method of JP-A-5-15474.

(b) The method of the present invention employs, as a pulse laser beam to be used for removing a foreign matter, one having a pulse width, a wavelength and an energy density per unit area on the glass substrate surface which satisfy relations totally different from conventionally conceived relations. The relations will be described in detail hereinafter.

The reason (a), i.e. the difference in the foreign matter to be removed will be explained in further detail. JP-A-5-15474 is to remove a stain adhering to a window glass, and as evident from use of an oil Magic Ink in Examples, it is to remove an organic substance. On the other hand, the method of the present invention is to remove a tin defect containing metal tin or a tin oxide as the main component, i.e. an inorganic substance.

Further, the stain on a window glass to be removed by the method of JP-A-5-15474 adheres to the surface of a glass substrate as a very thin layer such as an oil Magic Ink. On the other hand, the tin defect to be removed by the method of the present invention usually has a thickness at a level of from 0.5 μm to 3 μm.

The influence of these differences over conditions when the foreign matter is removed by application of a pulse laser beam will be explained below.

First, the foreign matter to be removed is an organic substance in the former and is an inorganic substance in the latter, whereby the absorption coefficients of the pulse laser beam at each wavelength are significantly different between an organic substance and an inorganic substance.

Further, there is a difference in the type (organic substance or inorganic substance) of the foreign matter, and the adhering foreign matter has substantially no thickness in the former, whereas it has a thickness at a level of from 0.5 μm to 3 μm in the latter, whereby there is a significant difference in the heat capacity between the former and the latter, and thus it is considered that there is significant differences in the total amount of a heat energy required for removal by evaporation and in the energy density per unit time.

Resultingly, it is considered that in the preliminary experiment as disclosed in JP-A-5-15474, in order to remove the foreign matter from the glass surface, it is required to apply a pulse laser beam having an energy density higher than the energy density with which the glass surface will be damaged.

Namely, the present invention is based on the discovery by the present inventors that the tin defect present on the glass substrate surface, as different from an organic substance such as an oil Magic Ink adhering to the glass surface, can be removed by application of a pulse laser beam having a high transmittance through the glass substrate.

Now, the reason (b) will be described below. The pulse laser beam used in the present invention has a wavelength with a transmittance of at least 70% through the glass substrate and is not substantially absorbed in a glass substrate. However, depending upon the relation of the pulse width, the wavelength and the energy density per unit area on the glass substrate surface, the energy density may be insufficient for removal of the tin defect on the glass substrate, or the glass substrate surface may be damaged by thermal processing when an energy density required for removal of the foreign matter is provided in some cases. In Examples as described hereinafter, when a pulse laser beam having a pulse width of 80 nsec and a wavelength of 1,064 nm was used, the tin defect on the glass substrate surface could not be removed at an energy density of 2.08 J/cm² per unit area on the glass substrate surface, and a damage was observed on the glass substrate surface when a pulse laser beam of 11.32 J/cm² was applied.

The present inventors have conducted extensive studies and as a result, found that in order to remove the tin defect without the glass substrate surface being damaged, the pulse width t, the wavelength λ and the energy density E per unit area on the glass substrate surface of the pulse laser beam to be used have to satisfy relations totally different from conventionally conceived relations.

Namely, in the present invention, the pulse width t, the wavelength λ and the energy density E per unit area on the glass substrate surface of the pulse laser beam to be used are required to satisfy the following formulae (1) and (2) simultaneously:

$$2.5 \times 10^8 \leq E/t \tag{1}$$

$$E/(\lambda \times t^{1/2}) \leq 1000 \tag{2}$$

wherein E is the energy density (J/cm²) of the pulse laser beam per unit area on the surface of the glass substrate, t is the pulse width (sec) of the pulse laser beam, and λ is the wavelength (nm) of the pulse laser beam.

When the pulse width t, the wavelength λ and the energy density E per unit area on the glass substrate surface of the pulse laser beam used satisfy the above formulae (1) and (2) simultaneously, the tin defect can be removed without the glass substrate surface being damaged.

The effect of removing the tin defect tends to be insufficient if the relation of the pulse width t, the wavelength λ and the energy density E per unit area on the glass substrate surface of the pulse laser beam to be used is $2.5 \times 10^8 > E/t$, and the glass substrate surface may be damaged by application of a pulse laser beam if $E/(\lambda \times t^{1/2}) > 1000$. This damage is very slight as compared with a damage considered to occur when the above conventional ultraviolet pulse laser is applied, but the glass substrate for a flat panel display is preferably free from such a damage. Accordingly, by the method of the present invention, the tin defect can be removed from the glass substrate surface without the glass substrate surface being damaged by selecting the pulse laser beam to be used so as to satisfy the above formulae (1) and (2).

In the method of the present invention, the pulse laser beam more preferably satisfies the following formula (3):

$$5.0 \times 10^8 \leq E/t \tag{3}$$

wherein E and t are as defined above.

If $2.5 \times 10^8 \leq E/t < 5.0 \times 10^8$, the tin defect may not be completely removed in some cases depending upon the manner of adhesion. However, when $5.0 \times 10^8 \leq E/t$, a very excellent effect of removing the tin defect from the glass substrate surface will be obtained, and the tin defect can be completely removed by adjusting the wavelength of the pulse laser beam to be used to a suitable range.

The reason why the tin defect can not completely be removed within the former range is considered to be because a tin oxide having a high degree of oxidation is contained depending upon conditions at the time of production.

Accordingly, when the production conditions under which a tin defect containing a tin oxide having a high degree of oxidation occurs can be known and the degree of oxidation can be experientially estimated, the tin defect can be completely removed even when it contains a tin oxide having a high degree of oxidation by setting the pulse width, the wavelength and the energy density per unit area on the glass substrate surface of the pulse laser beam so that the relations of the above formulae (1) and (2) are satisfied in accordance with the production conditions.

In the method of the present invention, the pulse laser beam more preferably satisfies the following formula (4):

$$E/(\lambda \times t^{1/2}) \leqq 500 \quad (4)$$

wherein E, t and λ are as defined above.

If $500 < E/(\lambda \times t^{1/2}) \leqq 1000$, the glass substrate surface may be damaged in some cases depending upon the combination of the pulse width, the wavelength and the energy density of the pulse laser beam used, the irradiation time, the composition of the glass substrate and conditions relating to removal of the tin defect such as adhesion of the tin defect to the glass substrate surface. This damage is slighter than the above-described damage which occurs on the glass substrate surface when $E/(\lambda \times t^{1/2}) > 1000$, its frequency of occurrence is low, and it is less problematic even in a glass substrate for a flat panel display having a higher definition. However, the glass substrate surface is preferably free from even such a damage if it can be avoided without a high cost.

The glass substrate surface will not be damaged when $E/(\lambda \times t^{1/2}) \leqq 500$.

In the present invention, the pulse laser beam to be used furthermore preferably satisfies both the above formulae (3) and (4). When the pulse laser beam satisfies both the above formulae (3) and (4), the tin defect can be completely removed from the glass substrate surface and the glass substrate surface will not be damaged.

As mentioned above, the pulse laser beam used in the present invention has a transmittance of at least 70% through the glass substrate and is not substantially absorbed in the glass substrate. As the advantage thereby, in the method of the present invention, the relation between the direction of application of the pulse laser beam and the face of the glass substrate on which the tin defect is present is not particularly limited. That is, the tin defect can be removed from the glass substrate surface either by applying the pulse laser beam directly to the glass substrate surface on which the tin defect is present or by applying the pulse laser beam from the rear face side through the glass substrate. In order to obtain the above advantage, the transmittance of the pulse laser beam through the glass substrate is preferably at least 75%.

However, the pulse laser beam is preferably applied from the rear face side through the glass substrate, not directly to the glass substrate surface on which the tin defect is present, from the following reasons.

In the method of the present invention, it is considered that the tin defect is removed from the glass substrate surface by application of a pulse laser beam by the following mechanism.

When a pulse laser beam is directly applied to the front face side of the glass substrate on which the tin defect is present, the energy is transmitted from the face irradiated with the pulse laser beam of the tin defect to the interior of the tin defect. While one pulse of the pulse laser beam is applied, the temperature to a certain depth from the face irradiated with the pulse laser beam of the tin defect suddenly increases to the melting point or the boiling point, and the tin defect to the above depth is removed by one pulse. Accordingly, when a pulse laser beam having a power capable of removing a tin defect with a depth of 0.5 μm per pulse is applied, the tin defect with a depth up to 0.5 μm from the face irradiated with the pulse laser beam will be removed by application of one pulse. On the other hand, when the pulse laser beam is applied from the rear face side through the glass substrate, the pulse laser beam is applied to an interface (adhesion surface) between the tin defect and the glass substrate. As a result, the tin defect and the glass substrate are separated at the adhesion surface by application of a pulse laser beam, and accordingly a tin defect having a thickness of 0.5 μm or above can be removed by application of one pulse of the pulse laser beam.

Further, according to the method of the present invention, when tin defects adhere to both surfaces of the glass, the tin defects which adhere to both surfaces can be removed simultaneously by application of a pulse laser beam once.

As mentioned above, a tin defect with a size of several μm called a top speck adheres to the top face of the glass substrate produced by a float process, and a tin defect called a bottom speck adheres to the bottom face of the glass substrate. Accordingly, removal of the tin defects which adhere to both surfaces of the glass by application of a pulse laser beam once is preferred to remove tin defects from a glass substrate produced by a float process.

In order to remove tin defects which adhere to both surfaces of the glass substrate, the pulse laser beam is applied preferably from the side on which a smaller tin defects adheres of the glass substrate. When the top speck and the bottom speck are considered, the bottom speck may be larger than the top speck in some cases. Accordingly, it is preferred to apply a pulse laser beam from the top face side to which the top speck adheres of the glass substrate.

The laser light source to be used in the method of the present invention widely includes one which generates a laser beam having a wavelength within the above range as a pulse laser beam which satisfies the relations of the above formulae (1) and (2) simultaneously. Accordingly, the laser light source of the present application includes, in addition to a laser light source of a type where an excitation light source oscillates pulses usually called a pulse laser, a laser light source of a type where the excitation light source provides a continuous light but a laser beam as a pulse beam is generated. Specifically, such a laser light source may, for example, be a Q-switch laser or a mode-lock laser.

Accordingly, the laser light source which can be used for the method of the present invention may be a gas laser such as a helium neon laser, a helium cadmium laser, an argon laser or a krypton laser, or may be a solid laser such as a ruby laser, a YAG laser or a glass laser. Among the above laser light sources, a YAG laser is preferred which easily generates a pulse laser beam which satisfy the relations of the above formulae (1) and (2).

In the method of the present invention, the pulse laser beam satisfies the above conditions and further, preferably has a pulse width of at most 20 nsec. As described above, if a pulse laser beam having a relatively long pulse width of 80 nsec is used, the range of the energy density on the glass substrate surface to remove the tin defect without the glass substrate surface being damaged is extremely narrow or is not present, and it was confirmed by Examples that industrial application of the present invention is difficult. Accordingly, the pulse width of the pulse laser beam used in the present invention is preferably short, and more specifically, it is preferably at most 20 nsec. If the pulse width is at most 20 nsec, when the pulse laser beam satisfies the above formulae (1) and (2), an excellent effect of removing the tin defect will be obtained without the glass substrate surface being damaged.

Further, as shown in the above formula (1) and (2), the pulse width is more preferably short. Specifically, the pulse width is more preferably at most 10 nsec, furthermore preferably at most 10 psec. At present, the pulse width of some laser beams reaches a level of femtoseconds. However, a femtosecond laser which is available at present is poor in stability and is hardly used for industrial application. If the technology of the femtosecond laser improves and its stability increases in future, it has a high potential of being applied to the method of the present invention.

Further, the method of the present invention using the pulse laser beam which satisfies the relations of the above formulae (1) and (2) provides the following advantage.

As described above, in the method of the present invention, when the pulse width is shortened within a range where the above formulae (1) and (2) are satisfied, the tin defect can be removed from the glass substrate surface without the glass substrate surface being damaged by application of a laser beam having an energy density much smaller than a conventional one.

Accordingly, the foreign matter removal range can be broadened, as compared with a conventional idea, when a laser at the same output is applied. Further, it is considered that tin defects in a wider area can be removed by one pulse laser irradiation apparatus by using a laser having a high repetition frequency and applying it by reciprocating the laser beam spot at a certain width as described hereinafter.

Namely, by the method of the present invention, it is possible to remove the tin defect without the glass substrate surface being damaged from a wider glass substrate surface by application of a pulse laser beam once, as compared with a conventional idea. Further, by using a laser having a high repetition frequency, it is possible to remove the tin defect without the glass substrate surface being damaged from a further wider glass substrate surface.

A preferred embodiment of the method of the present invention which becomes possible by the above will be explained below.

The preferred embodiment of the method of the present invention is a method of applying a pulse laser beam to a glass substrate having a certain width over the entire width.

When a pulse laser beam is applied to the glass substrate over the entire width, the entire glass substrate can be treated all at once by moving the glass substrate in a lengthwise direction, whereby the time required to remove the tin defect from the glass substrate surface can be shortened.

Further, the laser light source may be moved so that the laser beam application face is moved in the glass substrate lengthwise direction instead of moving the glass substrate in the lengthwise direction.

Figure 2:
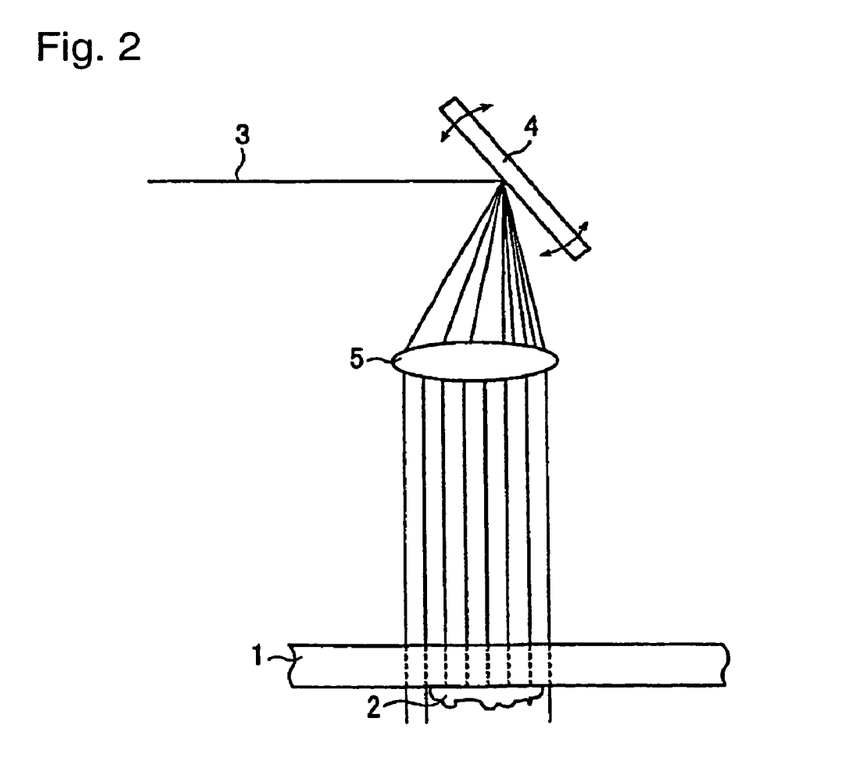
FIG. 2 is a view illustrating the concept of an optical system of a pulse laser irradiation apparatus wherein a pulse laser beam is scanned in the glass substrate width direction by a mirror.

In order to apply a pulse laser beam to the glass substrate over the entire width, specifically, for example, a spot of the pulse laser beam is scanned in the glass substrate width direction by using a mirror as shown in FIG. 2.

FIG. 2 is a view illustrating the concept of a laser beam irradiation apparatus wherein a spot of a pulse laser beam is scanned in the glass substrate width direction. In FIG. 2, a glass substrate 1 is shown in a widthwise section. A tin defect 2 is present on the surface of the glass substrate 1. A pulse laser beam 3 is applied to the surface on which the tin defect 2 is present of the glass substrate 1 from the rear face side through the glass substrate 1. In the pulse laser irradiation apparatus as shown in FIG. 2, the pulse laser beam 3 from a laser light source is scanned in the width direction of the glass substrate 1 by using a mirror 4 rotatable on an axis in a direction at a right angle with the traveling direction of the laser beam 3 (in a direction piercing the drawing). The scanned laser beam 3 is collimated by a lens 5 and applied from the rear face side opposite to the face on which the tin defect 2 is present of the glass substrate 1.

Figure 3:
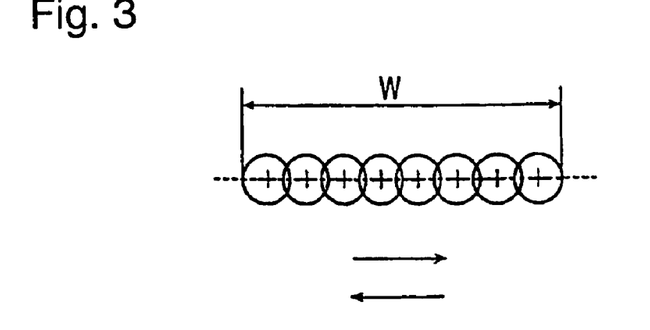
FIG. 3 is a view illustrating the positional relation of spots formed on the surface of a glass substrate by a plurality of laser beams parallel to one another in the pulse laser irradiation apparatus shown in FIG. 2.

FIG. 3 is a view illustrating the concept of the positional relation of spots formed on the glass substrate surface by a pulse laser beam scanned in the glass substrate width direction. As shown in FIG. 3, when a laser beam is scanned in the glass substrate width direction so that adjacent spots partially overlap and make no gap, the glass substrate can be irradiated over the entire width W with the pulse laser beam. The glass substrate is not necessarily irradiated over the entire width with the pulse laser beam using only one pulse laser beam irradiation apparatus, but two or more pulse laser beam irradiation apparatuses may be disposed in line in the glass substrate width direction to apply the pulse laser beam to the glass substrate over the entire width as a whole.

Figure 4:
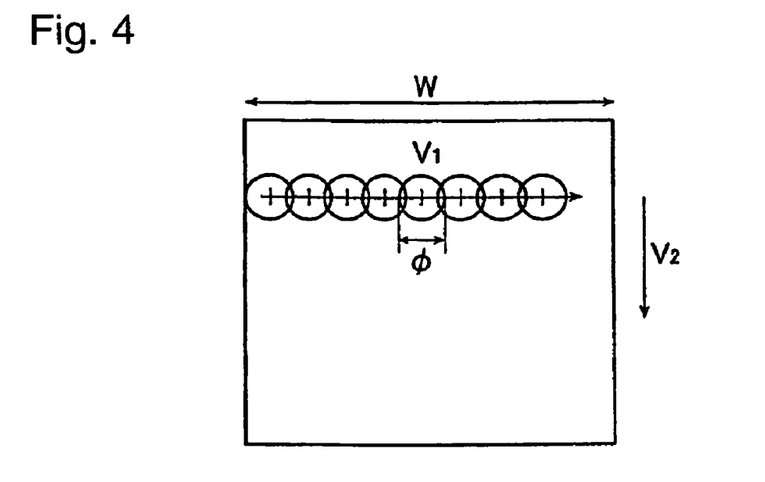
FIG. 4 is a view illustrating the relation between the scanning direction of a pulse laser beam and the moving direction of a glass substrate in the preferred embodiment of the present invention.

In order that the glass substrate is irradiated over the entire width by scanning the pulse laser beam in the glass substrate width direction, conditions should be set so that $V_1$ (m/sec) is at least smaller than R×Φ (m/sec) where, in FIG. 4 illustrating the relation between the scanning direction of the pulse laser beam and the glass substrate, W (m) is the width of the glass substrate, $V_1$ (m/sec) is the scanning rate of the pulse laser beam in the glass substrate width direction, Φ (m) is the spot diameter of the pulse laser beam and R (Hz) is the repetition frequency of the pulse laser beam.

Further, in FIG. 4, when the glass substrate or the laser light source is moved in the glass substrate lengthwise direction at a moving rate of $V_2$ (m/sec), in order to apply the pulse laser beam so that spots of the pulse laser beam partially overlap also in the glass substrate lengthwise direction, conditions should be set so that $V_2$ (m/sec) is at least smaller than R×Φ×Φ/W (m/sec).

The case where one pulse laser beam irradiation apparatus is used to apply the pulse laser beam to the glass substrate over the entire width is exemplified above. When two or more pulse laser beam irradiation apparatus are used, conditions should be set as mentioned above for each irradiation width shared by each irradiation apparatus, obtained by dividing the width of the glass substrate by the number of irradiation apparatuses.

Figure 5:
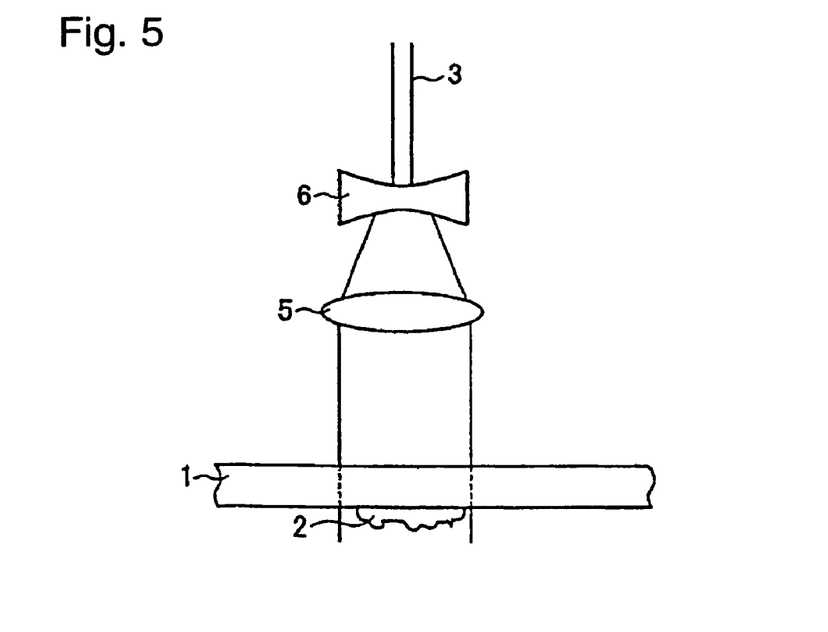
FIG. 5 is a view illustrating the concept of an optical system of a pulse laser irradiation apparatus using an optical system different from that of the apparatus shown in FIG. 3.

Further, in the method of the present invention, the method of applying the pulse laser beam to the glass substrate over the entire width is not limited to the above method of scanning the pulse laser beam by a mirror. As another method, specifically, as shown in FIG. 5 for example, a laser beam 3 may be expanded by a beam expander 6 and collimated by a lens 5, whereby a pulse laser beam having an expanded beam diameter is applied. In FIG. 5, numerical references 1 and 2 represent a glass substrate and a tin defect, respectively.

According to the preferred embodiment of the method of the present invention applying the pulse laser beam to the glass substrate over the entire width, the tin defect can be removed from the glass substrate surface on-line in a glass production process by a float process.

Figure 6:
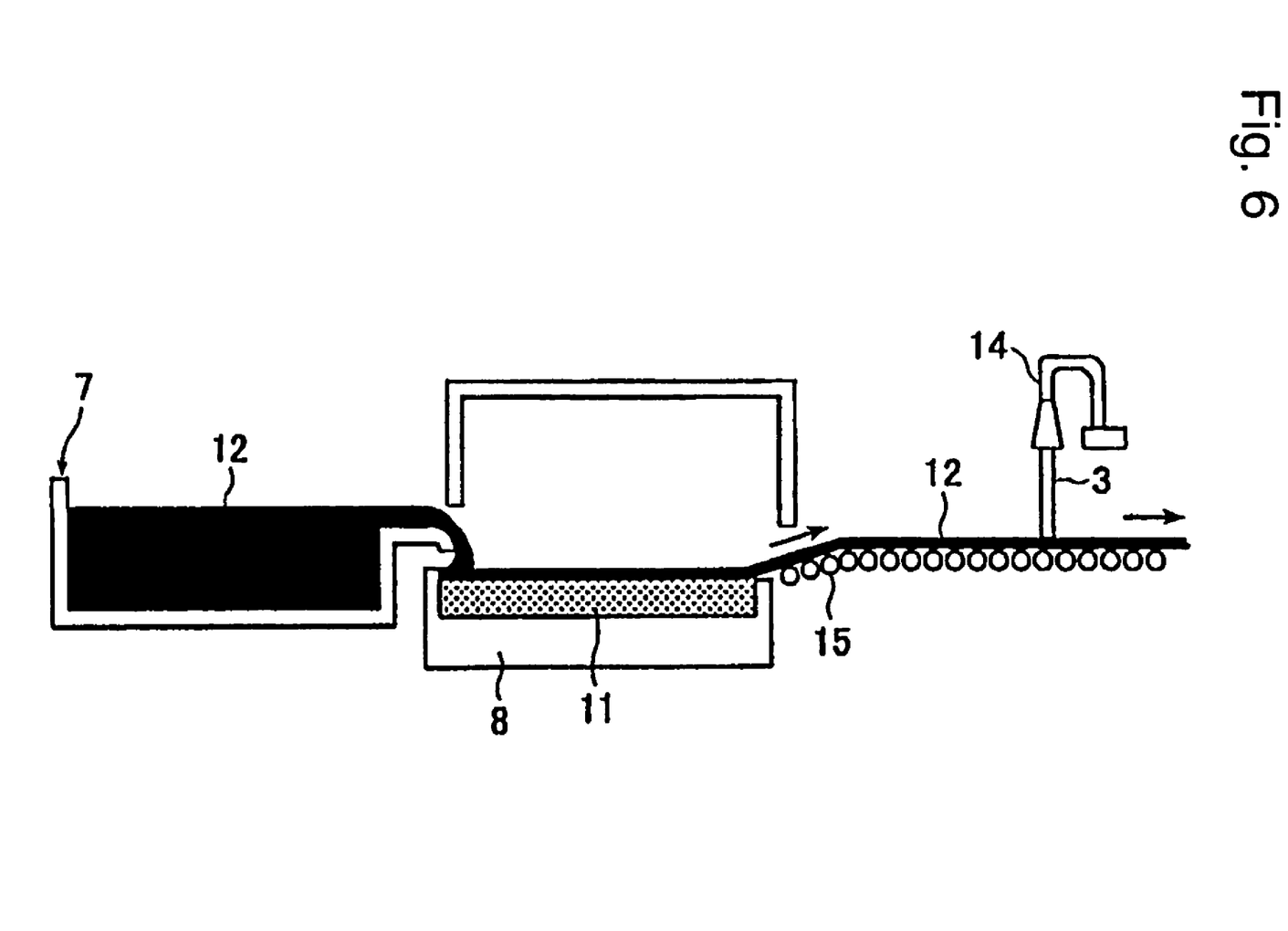
FIG. 6 is a view illustrating the concept of one example of a glass production line by a float process wherein a tin defect is removed on-line.

FIG. 6 is a view illustrating the concept of one example of a glass production line by a float process wherein a tin defect is removed on-line. In FIG. 6, molten glass 12 is continuously poured from a melting furnace 7 on a bath called a molten metal bath (float bath) 8 filled with molten metal tin 11 to form a glass ribbon, and the resulting glass ribbon is made to advance while being made to flow up along the surface of the molten metal bath to form a plate. The glass substrate formed into a plate is pulled by pulling rolls 15 and carried on the line continuously in the lengthwise direction.

In the present invention, a pulse laser beam 3 is applied from a pulse laser irradiation apparatus 14 to the glass substrate 12 carried on the line over the entire width. By keeping the pulse laser beam 3 being applied while the glass substrate 12 moves on the line, the tin defect can be removed from the glass substrate surface on-line irrespective of the position and the number of the tin defect on the glass substrate surface.

In FIG. 6, one pulse laser irradiation apparatus 14 is shown, but two or more apparatuses may be used, and such is rather preferred. When two or more pulse laser irradiation apparatuses 14 are used and set so that the pulse laser beam 3 as a whole is applied to the glass substrate 12 over the entire width, the pulse laser beam 3 having an energy sufficient to remove the tin defect can be applied to the glass substrate 12 moving on the line over the entire width without the glass substrate surface being damaged, whereby the tin defect can be removed from the glass substrate surface produced by a float process on-line.

The method of the present invention removing the tin defect by applying a pulse laser beam to the glass substrate surface is suitable to use on-line since the tin defect can be removed from the glass substrate surface in a short time.

By applying the method of the present invention to a glass substrate produced by a float process and carried on the line on-line, the tin defect can be removed from the entire glass substrate surface irrespective of the position and the number of the tin defect on the glass substrate surface. In this method, it is not necessary to find out the tin defect on the glass substrate surface and to position the spot of a pulse laser beam on the tin defect, whereby the time required for treatment is considerably shortened, and the yield of glass substrates produced by a float process is considerably improved.

Further, by the method of the present invention, as described above, the tin defect can be removed either by applying the pulse laser beam directly to the face to which the tin defect adheres or by applying the pulse laser beam from the rear face side through the glass substrate, and in a case where the tin defects adhere to both sides of the glass, the tin defects adhering to both sides can be removed simultaneously by one application of the pulse laser beam. Such is also preferred to remove the tin defect on-line from the glass substrate surface produced by a float process and moving on the line.

The preferred embodiment of the present invention is preferably applicable to use off-line, i.e. for a glass substrate produced by a float process and taken out from the line, in addition to use for a glass substrate produced by a float process on-line. Namely, the glass substrate taken out or the pulse laser light source may be moved in the glass substrate lengthwise direction while applying the pulse laser beam to the glass substrate over the entire width, whereby the tin defect can be removed from the entire glass substrate surface in one operation.

Further, according to the present invention, a glass substrate having the tin defect removed from the surface of a glass substrate by the above method is provided.

The glass substrate of the present invention, having the tin defect on the glass substrate surface inevitable in a glass substrate produced by a float process removed, is useful as a glass substrate for a flat panel display.

Now, the present invention will be described in further detail with reference to Examples. However, it should be understood that the present invention is by no means restricted to such specific Examples.

WORKING EXAMPLE 1

To a portion where a tin defect was present on the surface of a glass substrate for a flat panel display produced by a float process, a pulse laser beam was applied from the rear face side opposite to the face on which the tin defect was present through the glass substrate, from a pulse laser (YAG laser) of a type where an excitation light source oscillates pulses, and removal of the tin defect on the surface of the glass substrate and presence or absence of a damage on the surface (both front face and rear face) of the glass substrate after application of laser were examined by an optical microscope (apparatus name: Digital Highvision Microscope VQ-7000, manufactured by KEYENCE CORPORATION) at a sensitivity of from 300 to 500 magnifications.

The glass substrate had a thickness of 0.6 mm and the following composition:

$SiO_2$: 60 mass %
$Al_2O_3$: 17 mass %
$B_2O_3$: 8 mass %
$MgO+CaO+SrO+BaO+ZnO$: 15 mass %
$Li_2O+Na_2O+K_2O+Rb_2O+Cs_2O$: 0 mass %

In this Working Example, the wavelength, the pulse width and the energy density of the pulse laser beam were changed in twelve manners (Examples 1 to 12) as shown in Table 1, and operation was carried out four times in each manner. The results are shown in Table 1.

WORKING EXAMPLE 2

A pulse laser beam was applied to the surface of a glass substrate having a tin defect from the rear face side in the same manner as in Example 1 except that a Q-switch laser was used instead of the pulse laser of a type where the excitation light source oscillates pulses, and removal of the tin defect and presence or absence of a damage on the surface (both front face and rear face) of the glass substrate after application of laser were examined. The results are shown in Table 1.

In this Working Example, the wavelength, the pulse width and the energy density of the pulse laser beam were changed in two manners (Examples 13 and 14) as shown in Table 1, and operation was carried out four times in each manner. The results are shown in Table 1.

WORKING EXAMPLE 3

A pulse laser beam was applied to the surface of a glass substrate having a tin defect from the rear face side in the same manner as in Example 1 except that a mode-lock laser was used instead of the pulse laser of a type where the excitation light source oscillates pulses, and removal of the tin defect and presence or absence of a damage on the surface of the glass substrate after application of laser were examined. The results are shown in Table 1.

In this Working Example, the wavelength, the pulse width and the energy density of the pulse laser beam were changed in three manners (Examples 15 to 18) as shown in Table 1, and operation was carried out four times in each manner. The results are shown in Table 1.

TABLE 1

|  | Ex. 1 | Ex. 2 | Ex. 3 | Ex. 4 | Ex. 5 |
|---|---|---|---|---|---|
| Laser oscillation mechanism | Pulse oscillation | Pulse oscillation | Pulse oscillation | Pulse oscillation | Pulse oscillation |
| Wavelength $\lambda$ (nm) | 1064 | 1064 | 1064 | 1064 | 532 |
| Laser beam transmittance T (%) | 91 | 91 | 91 | 91 | 91 |
| Pulse width t | 8 nsec | 8 nsec | 8 nsec | 8 nsec | 7 nsec |
| Energy density E (J/cm$^2$) | 1.60 | 2.67 | 4.26 | 53.31 | 1.45 |
| E/t (W/cm$^2$) | $2.00 \times 10^8$ | $3.33 \times 10^8$ | $5.33 \times 10^8$ | $6.66 \times 10^9$ | $2.06 \times 10^8$ |
| E/($\lambda \cdot t^{1/2}$) | $1.68 \times 10^1$ | $2.80 \times 10^1$ | $4.48 \times 10^1$ | $5.60 \times 10^2$ | $3.25 \times 10^1$ |
| Removal of tin defect | X | Δ | ◯ | ◯ | X |
| Damage on glass surface | ◯ | ◯ | ◯ | Δ | ◯ |

|  | Ex. 6 | Ex. 7 | Ex. 8 | Ex. 9 | Ex. 10 |
|---|---|---|---|---|---|
| Laser oscillation mechanism | Pulse oscillation | Pulse oscillation | Pulse oscillation | Pulse oscillation | Pulse oscillation |
| wavelength $\lambda$ (nm) | 532 | 532 | 532 | 355 | 355 |
| Laser beam transmittance T (%) | 91 | 91 | 91 | 84 | 84 |
| Pulse width t | 7 nsec | 7 nsec | 7 nsec | 6 nsec | 6 nsec |
| Energy density E (J/cm$^2$) | 3.85 | 5.54 | 31.31 | 1.36 | 3.39 |
| E/t (W/cm$^2$) | $5.50 \times 10^8$ | $7.91 \times 10^8$ | $4.47 \times 10^9$ | $2.26 \times 10^8$ | $5.65 \times 10^8$ |
| E/($\lambda \cdot t^{1/2}$) | $8.66 \times 10^1$ | $1.24 \times 10^2$ | $7.03 \times 10^2$ | $4.93 \times 10^1$ | $1.23 \times 10^2$ |
| Removal of tin defect | Δ | ◯ | ◯ | X | Δ |
| Damage on glass surface | ◯ | ◯ | Δ | ◯ | ◯ |

|  | Ex. 11 | Ex. 12 | Ex. 13 | Ex. 14 | Ex. 15 |
|---|---|---|---|---|---|
| Laser oscillation mechanism | Pulse oscillation | Pulse oscillation | Continuous oscillation (Q-Switch) | Continuous oscillation (Q-Switch) | Continuous oscillation (Mode-lock) |
| wavelength $\lambda$ (nm) | 355 | 355 | 1064 | 1064 | 1064 |
| Laser beam transmittance T (%) | 84 | 84 | 91 | 91 | 91 |
| Pulse width t | 6 nsec | 6 nsec | 80 nsec | 80 nsec | 10.5 psec |
| Energy density E (J/cm$^2$) | 4.07 | 22.61 | 2.08 | 11.32 | $3.12 \times 10^{-3}$ |
| E/t (W/cm$^2$) | $6.78 \times 10^8$ | $3.77 \times 10^9$ | $2.60 \times 10^7$ | $1.41 \times 10^8$ | $2.97 \times 10^8$ |
| E/($\lambda \cdot t^{1/2}$) | $1.48 \times 10^2$ | $8.22 \times 10^2$ | $9.19 \times 10^1$ | $5.00 \times 10^2$ | $9.04 \times 10^{-1}$ |
| Removal of tin defect | ◯ | ◯ | X | ◯ | ◯ |
| Damage on glass surface | ◯ | Δ | ◯ | X | ◯ |

|  | Ex. 16 | Ex. 17 | Ex. 18 |
|---|---|---|---|
| Laser oscillation mechanism | Continuous oscillation (Mode-lock) | Continuous oscillation (Mode-lock) | Continuous oscillation (Mode-lock) |
| wavelength $\lambda$ (nm) | 1064 | 1064 | 1064 |
| Laser beam transmittance T (%) | 91 | 91 | 91 |

TABLE 1-continued

| Pulse width t | 10.5 psec | 12 psec | 12 psec |
|---|---|---|---|
| Energy density E (J/cm$^2$) | $3.49 \times 10^{-2}$ | $3.03 \times 10^{-3}$ | $4.55 \times 10^{-3}$ |
| E/t (W/cm$^2$) | $3.32 \times 10^9$ | $2.53 \times 10^9$ | $3.79 \times 10^8$ |
| E/($\lambda \cdot t^{1/2}$) | $1.01 \times 10^1$ | $8.22 \times 10^{-1}$ | $1.23 \times 10^0$ |
| Removal of tin defect | ○ | ○ | ○ |
| Damage on glass surface | ○ | ○ | ○ |

In Table 1, the transmittance of the laser beam was obtained from the following formula by detecting the intensity $I_{in}$ of the pulse laser beam before it passed through the glass substrate and the intensity $I_{out}$ of the pulse laser beam after it passed through the glass substrate by a laser beam detector (Energy/Power meter: 3 sigma, Probe: PM-30, manufactured by Molectron Detector Inc.):

Transmittance(%)=$I_{out}/I_{in}$×100

In Table 1, symbols in items regarding the removal of the tin defect and the damage on the glass substrate surface mean as follows.

(Removal of Tin Defect)
 X: The tin defect not removed in all four operations.
 Δ: The tin defect removed in some operations among four operations and not removed in the other operations.
 ○: The tin defect removed in all four operations.

(Damage on Glass Surface)
 X: Damage confirmed on the glass substrate surface (at least one of the front face and the rear face) in all four operations.
 Δ: A damage confirmed on the glass substrate surface (at least one of the front face and the rear face) in some operations among four operations and not confirmed in the other operations.
 ○: No damage confirmed on the glass substrate surface (both the front face and the rear face) in all four operations.

As shown in Table 1, it was confirmed that the tin defect was removed from the glass substrate surface when a pulse laser beam wherein $2.5 \times 10^8 \leq$ E/t and E/($\lambda \times t^{1/2}$)$\leq 1000$ was used, regardless of the type of the laser light source (excitation light source pulse, Q-switch laser, Mode-lock laser). Further, it was confirmed that the tin defect was removed without the glass substrate surface being damaged when a pulse laser beam wherein $5.0 \times 10^8 \leq$ E/t and E/($\lambda \times t^{1/2}$)$\leq 500$ was used.

WORKING EXAMPLE 4

The same operation as in Examples 3, 7, 11 and 13 in Working Example 1 was carried out except that the pulse laser beam was applied directly to the face on which the tin defect was present of a glass substrate, and removal of the tin defect from the glass substrate surface and presence or absence of a damage on the glass substrate surface (front face and rear face) were examined. As a result, it was confirmed that the tin defect was removed without the glass substrate surface being damaged in a case where the pulse laser beam was directly applied to the face on which the tin defect was present of the glass substrate, similarly to a case where the pulse laser beam was applied from the rear face side through the glass substrate.

WORKING EXAMPLE 5

In this Working Example, it is attempted to remove a tin defect on-line from the surface of a glass substrate produced by a float process and moving on the line in a glass substrate production equipment by a float process as shown in FIG. 6.

In this Working Example, a pulse laser beam is to be applied to a glass substrate over the entire width by disposing a pulse laser beam irradiation apparatus scanning the laser beam by a mirror as shown in FIG. 2 and by setting the scanning width of the pulse laser beam to 10 cm relative to the glass substrate having a width of 10 cm. Specifications of the pulse laser beam irradiation apparatus and the glass substrate used are as follows.

(Pulse Laser Beam Irradiation Apparatus)
 YAG laser (excitation light source continuous type (Mode-lock laser))
  Number of irradiation apparatus: one
  Scanning width: 5 cm
  Wavelength: 1064 nm
  Transmittance (%) of pulse laser beam: 91%
  Pulse width (t): 10.5 psec
  Energy density (E) on the glass substrate surface: $3.49 \times 10^{-2}$ J/cm$^2$
  E/t=$3.32 \times 10^9$
  E/($\lambda \times t^{1/2}$)=$1.01 \times 10^1$
  Spot diameter (Φ): 22.6 μm
  Repetition frequency (R): 50 MHz
  Scanning rate ($V_1$) in glass substrate width direction: 565 m/sec<50 MHz (R)×22.6×10$^{-6}$ m (Φ)

(Glass Substrate)
 Glass substrate for a flat panel display
 Composition (represented by mass percentage)
  SiO$_2$: 60%
  Al$_2$O$_3$: 17%
  B$_2$O$_3$: 8%
  MgO+CaO+SrO+BaO+ZnO: 15%
  Li$_2$O+Na$_2$O+K$_2$O+Rb$_2$O+Cs$_2$O: 0%
  Width: 10 cm (W)
  Thickness: 0.6 mm
  Moving rate ($V_2$) in lengthwise direction: 10 cm/sec<50 MHz (R)×(22.6×10$^{-6}$ m (Φ))$^2$/0.05 m (W)

A pulse laser beam is kept being applied to the glass substrate carried on the line under the above conditions. Then, the glass substrate is cut into a size with a length of 10 cm and a width of 5 cm, and presence or absence of a tin defect and presence or absence of a damage on the glass substrate surface (front face and rear face) are examined. As a result, no tin defect nor damage is confirmed on the glass substrate surface.

Measurements of the laser energy density, presence or absence of the tin defect and the presence or absence of the damage are carried out in the same manner as in Working Example 1.

According to the method of the present invention, a tin defect present on the surface of a glass substrate produced by a float process can be very quickly removed without the glass substrate surface being damaged.

According to the method of the present invention, a tin defect present on the surface of a glass substrate can be removed either by applying a pulse laser beam directly to the face on which the tin defect is present of the glass substrate or by applying a pulse laser beam from the rear face side opposite to the face on which the tin defect is present through the glass substrate. Further, when tin defects are present on both sides of the glass substrate, the tin defects on both sides can be removed simultaneously by one application of a pulse laser beam.

The preferred embodiment of the method of the present invention of applying a pulse laser beam to a glass substrate over the entire width can be preferably applicable to removal of a tin defect on-line from the surface of a glass substrate carried on the line in a glass production line by a float process. By such a use on-line, the tin defect is continuously removed from the entire surface of a glass substrate moving on the line, whereby the time required for removing the tin defect is further shortened, and the yield of the glass to be produced will considerably improve. The preferred embodiment of the present invention is also preferably applicable to use off-line for a glass substrate taken out from the line, by relatively moving the glass substrate or a pulse laser light source in the glass substrate lengthwise direction, and the tin defect can be removed from the entire glass substrate surface in one operation.

The glass substrate of the present invention has no tin defect on its surface, and is suitable as a glass substrate for a flat panel display.

The entire disclosure of Japanese Patent Application No. 2003-027237 filed on Feb. 4, 2003 including specification, claims, drawings and summary are incorporated herein by reference in its entirety.

What is claimed is:

1. A method for removing a tin-containing foreign matter on a first and a second surface of a glass substrate, the method comprising applying to the surface of the glass substrate produced by a float process a pulse laser beam which has a transmittance of at least 70% through the glass substrate and which satisfies the following formulae (1) and (2), thereby removing the tin-containing foreign matter present on the first surface irradiated with the pulse laser beam and on a second side opposite to the first side irradiated with the pulse laser beam:

$$2.5 \times 10^8 \leq E/t \tag{1}$$

$$E/(\lambda \times t^{1/2}) \leq 1000 \tag{2},$$

wherein E is the energy density (J/cm²) of the pulse laser beam per unit area on the surface of the glass substrate, t is a pulse width (sec) of the pulse laser beam, and $\lambda$ is a wavelength (nm) of the pulse laser beam.

2. The method for removing a tin-containing foreign matter according to claim 1, wherein the pulse laser beam has a transmittance of at least 75% through the glass substrate.

3. The method for removing a tin-containing foreign matter according to claim 1, wherein the pulse laser beam has the wavelength of from 350 to 1200 nm.

4. The method for removing a tin-containing foreign matter according to claim 1, wherein the pulse laser beam has the pulse width of at most 20 nsec.

5. The method for removing a tin-containing foreign matter according to claim 1, wherein the pulse laser beam is applied to the glass substrate over the entire width.

6. The method for removing a tin-containing foreign matter according to claim 1, wherein the glass substrate is a glass substrate for a flat panel display.

7. The method for removing a tin-containing foreign matter according to claim 1, wherein the glass substrate has a thickness of at least 0.4 mm and at most 3 mm.

8. The method for removing a tin-containing foreign matter according to claim 1, wherein the glass substrate has the following composition:
$SiO_2$: 40 to 85 mass %
$Al_2O_3$: 0 to 35 mass %
$B_2O_3$: 0 to 25 mass %
$MgO+CaO+SrO+BaO+ZnO$: 1 to 50 mass %, and
$Li_2O+Na_2O+K_2O+Rb_2O+Cs_2O$: 0 to 1 mass %.

9. The method for removing a tin-containing foreign matter according to claim 1, wherein the glass substrate has the following composition:
$SiO_2$: 40 to 85 mass %
$Al_2O_3$: 2 to 35 mass %
$B_2O_3$: 0 to 25 mass %
$MgO+CaO+SrO+BaO+ZnO$: 1 to 50 mass %, and
$Li_2O+Na_2O+K_2O+Rb_2O+Cs_2O$: 1.1 to 30 mass %.

10. The method for removing a tin-containing foreign matter according to claim 1, wherein the glass substrate has the following composition:
$SiO_2$: 40 to 80 mass %
$Al_2O_3$: 0 to 2 mass %
$MgO+CaO+SrO+BaO+ZnO$: 1 to 50 mass %, and
$Li_2O+Na_2O+K_2O+Rb_2O+Cs_2O$: 1.1 to 30 mass %.

11. The method for removing a tin-containing foreign matter according to claim 1, wherein the tin-containing foreign matter is removed without damaging the glass substrate.

* * * * *